United States Patent [19]
Heinz et al.

[11] Patent Number: 6,065,586
[45] Date of Patent: May 23, 2000

[54] SPACING DEVICE FOR SPREADING STAMPED MATERIAL

[75] Inventors: Daniel John Heinz, Joppa, Md.; Oliver Klein, Mannheim, Germany; Mario Peter Neuhof, Hohenahr-Altenkirchen, Germany; Hans Juergen Solert, Bruhl, Germany; Kevin John Stamp, Baltimore, Md.

[73] Assignee: Lever Brothers Company, A Division of Conopco, Inc., New York, N.Y.

[21] Appl. No.: 08/916,858

[22] Filed: Aug. 22, 1997

[30] Foreign Application Priority Data

Aug. 28, 1996 [DE] Germany ............... 196 34 867
Sep. 12, 1996 [DE] Germany ............... 196 37 184

[51] Int. Cl.[7] .................................. B65G 47/26
[52] U.S. Cl. ....................... 198/458; 198/459.1
[58] Field of Search ................ 198/458, 459.1, 198/468.3

[56] References Cited

FOREIGN PATENT DOCUMENTS

| | | |
|---|---|---|
| 299 067 | 6/1972 | Austria . |
| 163 256 | 12/1985 | European Pat. Off. . |
| 326 872 | 8/1989 | European Pat. Off. . |
| 2 371881 | 6/1978 | France . |
| 2 697 235 | 4/1994 | France . |
| 59-167401 | 9/1984 | Japan . |
| 59-167401 | 1/1985 | Japan . |
| 633 649 | 12/1949 | United Kingdom . |
| 82/02871 | 9/1982 | WIPO . |

*Primary Examiner*—Christopher P. Ellis
*Assistant Examiner*—Kenneth W. Bower
*Attorney, Agent, or Firm*—Alan A. Bornstein

[57] ABSTRACT

A spacing device for spreading stamped material, especially soap bars, during transfer from a stamping process to a packaging process comprises a train of at least a first and last coupled carriages mounted for movement along an axis and coupled together to allow spacing therebetween upon movement of one of the carriages. A single driving mechanism is provided to move the first carriage along the axis. An actuating mechanism, such as a rack and pinion or a crank lever, is operably connected to the first carriage such that when the driving mechanism moves the first carriage along the axis, the actuating mechanism moves the last carriage along the axis in a direction opposite to the direction of movement of the first carriage, thereby spacing the train of carriages apart.

15 Claims, 3 Drawing Sheets

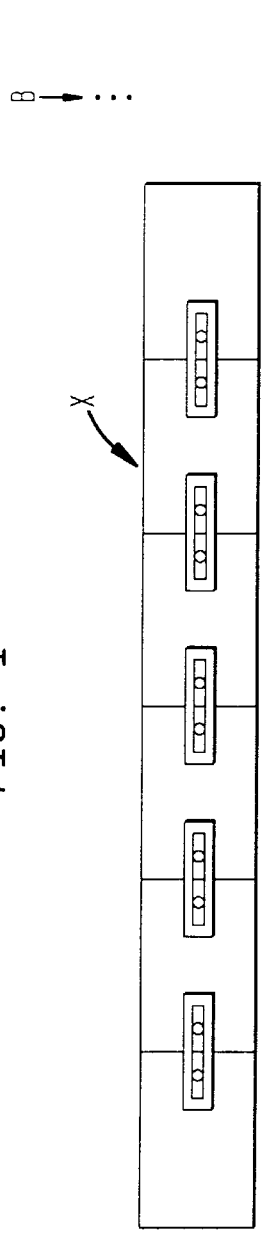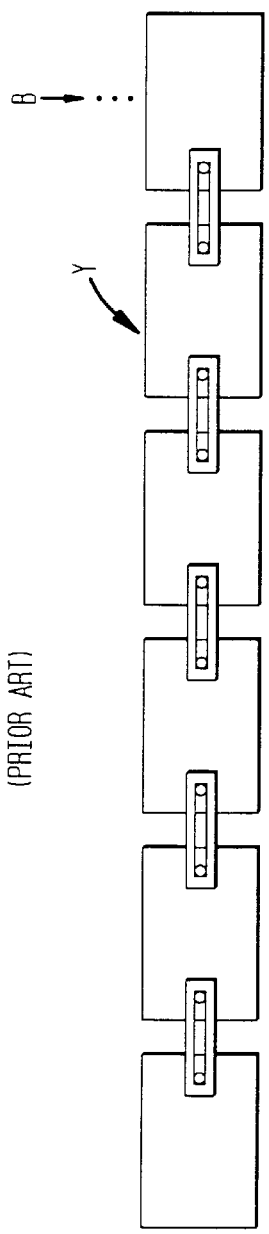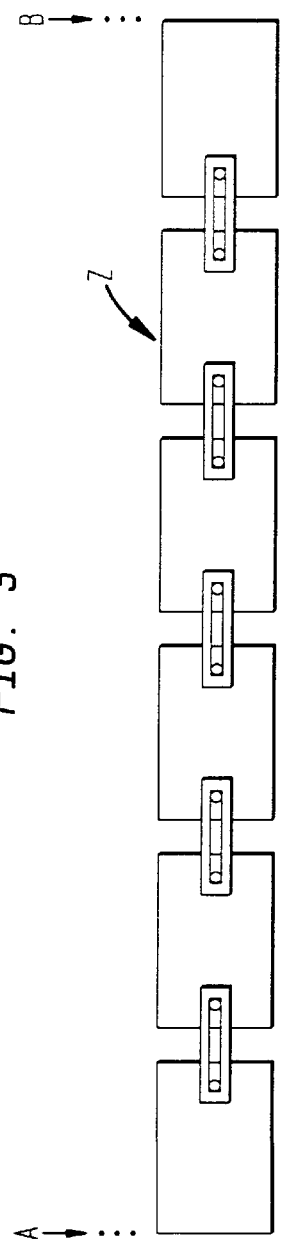

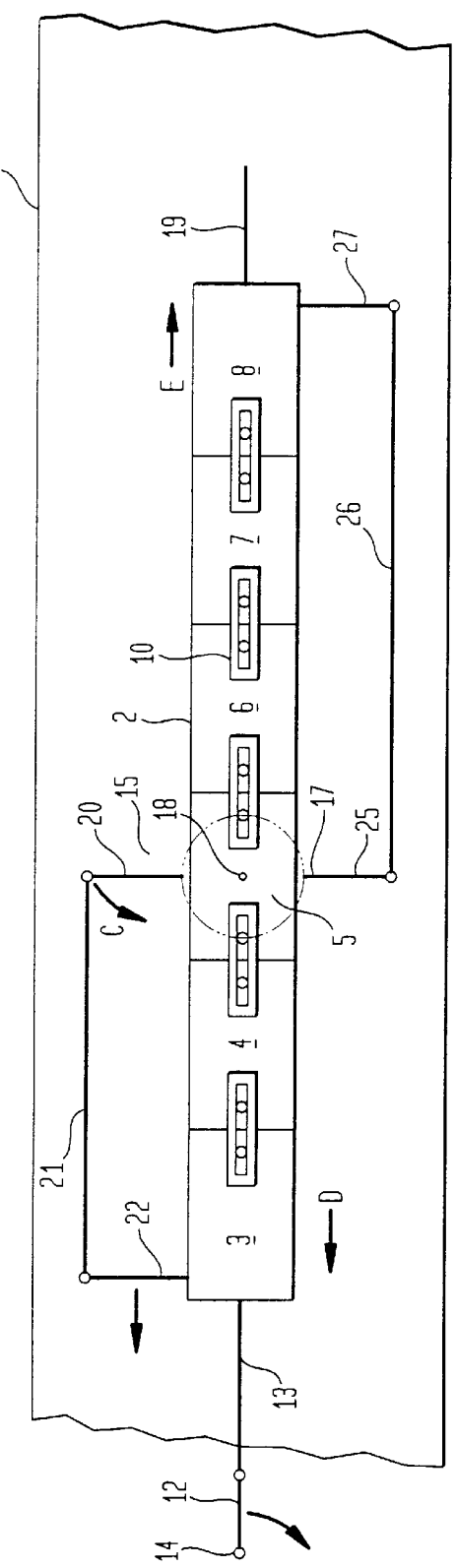
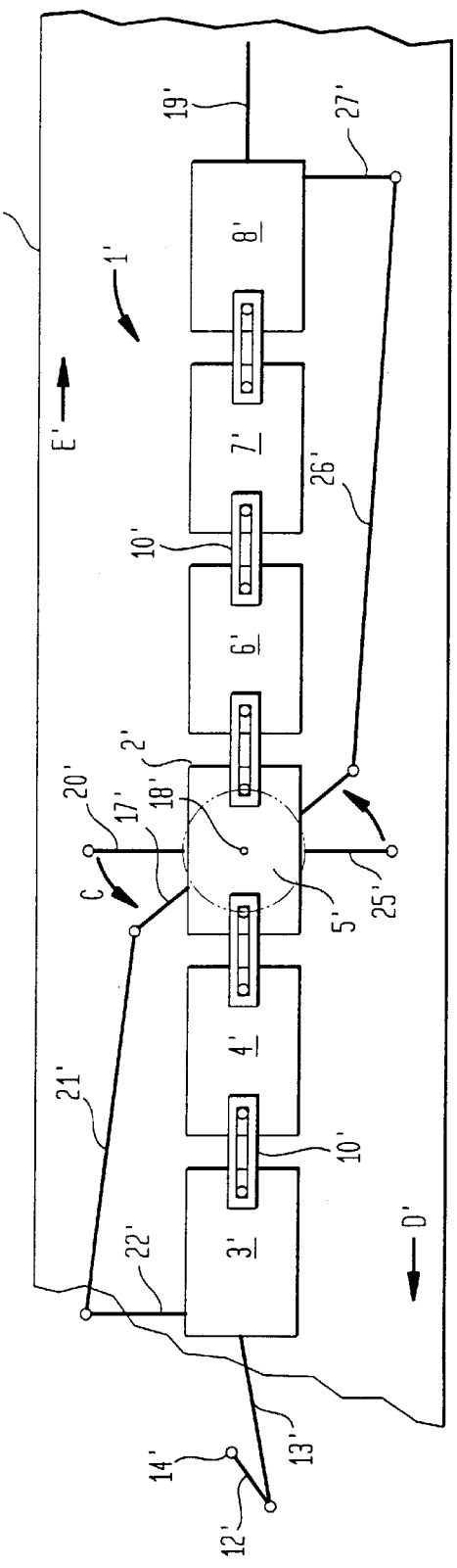
FIG. 4
FIG. 5

SPACING DEVICE FOR SPREADING STAMPED MATERIAL

TECHNICAL FIELD

The present invention relates to the stamping of material into predetermined, preferred unit shapes. In particular, the invention relates to a spacing device, an installation comprising such a device and a process for transferring stamped material from a stamping means to a packaging means by means of such a device to allow efficient packaging. More particularly, the present invention relates to a spacing device for detergent bars.

BACKGROUND TO THE INVENTION

Traditionally, stampable material, for example soap, is stamped from extruded billets of material in order to produce units (for example soap bars) of an attractive and uniform appearance. Such stamping may be achieved using a pair of opposing die members which are physically brought together in a compaction step to stamp the units.

Typically, die cavities are spaced reasonably close together (relative to the spacing of the bucket compartments of a conveyor belt for transportation of the units to a packing means) to maximise the space offered by each die. The stamped units must therefore be spaced apart by a capable means so that the units can be easily transferred to the buckets on the conveyor belt.

One such separating means is known in the art, wherein a spacing device comprises a plate on which several carriages may slide in one direction. The carriages are coupled to one another, in a manner similar to the coupling of railway carriages. When an end carriage is driven forward in one direction, it travels a certain distance before the coupling to the next carriage becomes effective, at which point the coupling transmits driving force to the adjacent carriage which itself begins to move. As each successive coupling transmits the driving force to successive carriages, so the train of carriages extends its length, the spacing between carriages increasing due to the extension of the individual coupling units.

A significant problem faced with such any increase in the number of cavities per die (i.e. to increase production output), is that the length of the conventional spacing device required to allow adequate spacing of units becomes too large for stamping machines designed to conform with the industry's dimensional standards. To simply increase the size of the stamping machines is not economically acceptable since factory space is typically at a premium.

Thus, a spacing device which simply spaces the train of carriages by pulling or pushing an end carriage is not effective for spacing the carriages within a relatively narrow space.

Other problems encountered, if the spacing device is increased, include the decreased mechanical efficiency of such a long spacing mechanism and the fact that a longer beam is necessarily heavier and thus more difficult to support without using extra, valuable space within the machine.

Italian manufacturers Binnachi have disclosed a spacing device for spreading soap bars during transfer from a stamping means to a packaging line, the device comprising a train of carriages, each carriage being mounted for movement along an axis and adapted to receive a unit of stamped material, the carriages being coupled together to allow spacing therebetween/upon movement of one or both of the carriages, and a pair of driving means for pulling a first and last carriage in opposite directions to effect the spacing of the carriages therebetween. While such a system is effective at spacing the carriages in a relatively narrow space, the provision of a driving means at each end of the train of carriages in itself takes up quite a lot of space. In addition, the provision of a separate driving means complicates the mechanics of operation, increases the energy load of the machine and, like any other part of the machine, is prone to wear and tear.

It is an object of the present invention to overcome at least some of the above problems and provide a spacing device which is efficient, reliable and does not take up much space.

SUMMARY OF THE INVENTION

According to the invention, there is provided a spacing device of the above type, characterised in that a single driving means is provided and in that the first carriage or single driving means is operatively connected to an actuating means such that when the single driving means moves the first carriage along the axis, the actuating means moves the last carriage along the axis in a direction opposite to the direction of movement of the first carriage, thereby spacing the train of carriages apart.

A spacing device formed in accordance with the invention requires only a single driving means and thus requires less space and less energy to operate compared to the known devices. Further it is easier to maintain. Various actuator means are envisaged by the inventors, but all are based on the main inventive concept that the movement of a carriage on one end of the train is transferred to an actuator means intermediate the ends of the train, which in turn transfers this motion to a carriage at an opposite end of the train.

For example in a particularly preferred embodiment of the invention the actuating means is a lever having a first end connected via linkages to the first carriage (or in the case of a multiple carriage train, a carriage adjacent or close to the first carriage) and an opposite end connected via linkages to the last carriage, whereby pivotal movement of the lever effects spacing of the at least first and last carriages. Generally, with such a lever type system, the train will include one or more, ideally four, carriages intermediate the first and last carriages and the lever will be pivotable about one of the intermediate carriages. Preferably Ideally, when the train comprises six carriages, the lever will be pivotable about the third carriage. Generally, the carriage about which the lever pivots will be fixed. The lever may however be fixed anywhere intermediate the ends of the train. In this regard the length of the arms of the lever on each side of its pivotal axis may be varied depending on its position along the axis of the train. Thus, when the lever is positioned half way along the train, the lengths of the arms will be equal. However, if the lever is pivotable about the third carriage of a six carriage train, the arm of the lever which is connected (via linkages) to the first carriage will be two-thirds the length of the arm connected (via linkages) to the last (sixth) carriage.

In an alternative embodiment of the invention the actuating means comprises a rack and pinion means which generally will include a pinion positioned along the axis of movement of the carriages between the first and last carriages, a first rack operably connecting the first carriage to the pinion and a second rack operably connecting the pinion to the last carriage.

Preferably the above embodiment will include a train having seven carriages wherein the pinion is adjustably mounted beneath the forth carriage and the first rack is fixed to the third carriage. The pinion may however be adjustably connected anywhere along the axis of the train between the ends of the train, and in this regard both the lengths of the first and second racks and the carriages that they are fixed to may be varied. It is important to note however that even when the first rack is connected to the third carriage, that the movement of the first carriage will, after a short time lag, effect movement of the first rack via movement of the second and third carriages. Thus the first rack does effectively operably connect the first carriage to the pinion.

The carriages formed in accordance with the invention are movably mounted on a carriage support means, which carriage support means is ideally rotatable about a vertical axis perpendicular to the longitudinal axis of the train. Ideally, the actuating means is contained within the carriage support means.

The stamped material may be of any material capable of being stamped for mass production. Such material may include for example material to be formed into sweets, ice creams, and burgers. However, the invention is particularly suitable for use in the production of detergent bars.

In another embodiment of the invention, there is provided a process for manufacture of packaged stamped units comprising transferring units of stamped material from a stamping means to a packaging means by means of a spacing device as described above.

Preferably, after collection from the dies, each set of stamped units is rotated vertically downwards through an angle about the longitudinal axis of the collecting means. The angle may preferably be 90°.

In a still further embodiment of the invention an installation is provided for manufacture of packaged stamped units characterised in that it comprises a spacing device as described above.

BRIEF DESCRIPTION OF THE DRAWING

The invention will be more clearly understood from the following description of some embodiments thereof, given by way of example only, with reference to the accompanying drawings in which:

FIG. 1 is a schematic representation of a train of carriages prior to spacing;

FIG. 2 is a schematic representation of the train of carriages of FIG. 1 after spacing according to a method of the prior art;

FIG. 3 is a schematic representation of the train of FIG. 1 after spacing according to the present invention;

FIG. 4 is a schematic representation of a spacing device according to the present invention, prior to spacing;

FIG. 5 is a schematic representation of the spacing device of FIG. 4 after spacing;

DETAILED DESCRIPTION OF THE INVENTION

Figure 6:
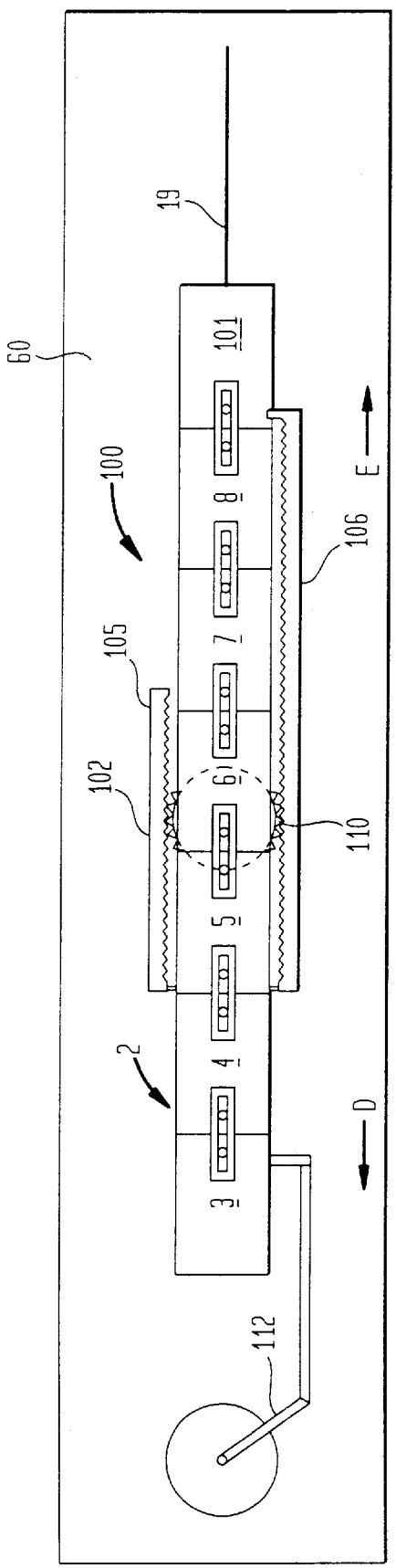
FIG. 6 is a schematic representation of a spacing device according to an alternative embodiment of the invention, prior to spacing.

Referring initially to FIGS. 1 to 3, one of the general objects of the current invention is illustrated by means of a comparison with the prior art. As mentioned previously, one of the main problems associated with soap making lines is that of space. This problem is particularly acute with the part of the line where the soap bars are transferred from the dies to the packaging line. Briefly, when the soap bars come off the dies they are quite closely grouped together. FIG. 1 illustrates a spacing device comprising a train of carriages X, each of which accepts a soap bar from the dies. In order for the soaps bars to be transferred to the packaging line the bars must be spaced apart to conform to the spacing of the buckets on the conveyor leading to the packaging line. Yet, due to a general lack of space within the line, the spacing must be carried out within a defined area, which in FIGS. 1 to 3 is indicated by the broken lines A, A' and A" and B, B' and B". Lines A, A', A" are colinear as are lines B, B' and B". FIG. 2 illustrates a method of the prior art whereby the train y is spaced in one direction (ie. it is simply pulled from the right hand side). Thus it can be seen that the train of carriages extends beyond the line B' and thus is not suitable for the line. Referring to FIG. 3, where the train of carriages Z is spaced in both directions, it can be seen how bi-directional spacing allows the train of carriages Z to be spaced apart sufficiently and still remains within the dimensional confines of the lines A" and B". While bi-directional spacing does not itself form part of the current invention, the present developments are based on an improved method of bi-directional spacing whereby spacing in both directions is achieved using only a single driving means which allows further economy of space usage.

Referring now to FIGS. 4 and 5, there is illustrated a spacing device for spreading soap bars according to a preferred embodiment of the invention, and indicated generally by the reference numerals 1 and 1', which device 1 comprises an unexpanded train 2 of six carriages, 3,4,5,6,7,8 mounted upon a carriage supporting means (not shown). The carriages 3,4,5,6,7,8 are linked together by means of brackets 10 which allow the carriages to be spaced apart (see FIG. 5). In practice, each carriage will include a suction cup for receipt of a bar of soap. Driving means, in the form of a rotatable crank arm 12 which rotates about a fixed point 14 is connected to the first carriage 3 by means of a drive link 13. In turn, the first carriage 3 is operatively connected to an actuating means 15, which transfers the motion of the first carriage 3 to the last carriage 8, thereby moving the last carriage in a direction opposite to that of the first carriage 3.

In more detail, the actuating means 15 comprises a pivotable lever 17 which pivots about a pivot axis 18 which is situated on the longitudinal axis 19 of the train 2. A first arm 20 of the lever 17 is connected to the first carriage 3 via a linkage 21 and a fixed rod 22. In a similar manner, a second lever arm 25 is connected to the last carriage 8 via a linkage 26 and a fixed rod 27. The carriage 5 about which the lever 17 pivots, is fixed to the carriage support means 50. Actuating means 15 is contained in carriage support means 50. In use, operation of the drive means causes the crank arm 12' to rotate clockwise to a position illustrated in FIG. 5. This movement pulls the first carriage 3' in a direction indicated by the arrow marked D' in FIG. 4. As the carriage 3' moves in the direction of the arrow D' the initially closed brackets 10' connecting carriage 3', 4' and 5' successively open up to allow the spacing of these three carriages. As the third carriage 5' is fixed it cannot move. The motion of the first carriage 3' is transferred via the rod 22' and the linkage 21' to the lever 17' which pivots on its axis 18' in the direction of the arrow marked C. In turn the pivotal movement of the lever 17' is transferred via the linkage 26' and the rod 27' into movement of the last carriage 8' along the axis 19' of the train 2' in the direction of the arrow E'. This movement of the last carriage 8' pulls the adjacent carriages 6' and 7' away from the fixed carriage 5' thus spacing the three carriages resulting in a spaced train 2' of carriages as illustrated in FIG. 5. In practice, the movement of the first and last carriages 3',8' is instantaneous.

It is worthwhile noting that the lever 17' may be effectively positioned at any point along the longitudinal axis 19' of the train 2' intermediate the first and last carriages 3',5'. For example, in the above embodiment, the lever is positioned on the third carriage 5 of a six carriage train. In such a position, in order for the actuating means to operate effectively, the length of lever arms 20', 25' on each side of the pivot axis need to be in the same ratio as the ratio of the number of carriages on either side of the lever. Thus, in this case there are two carriages on the left side of the lever and three on the right. Thus the ratio of the length of the first lever arm 20 to the length of the second lever arm 25 should be 2:3.

Figure 7:
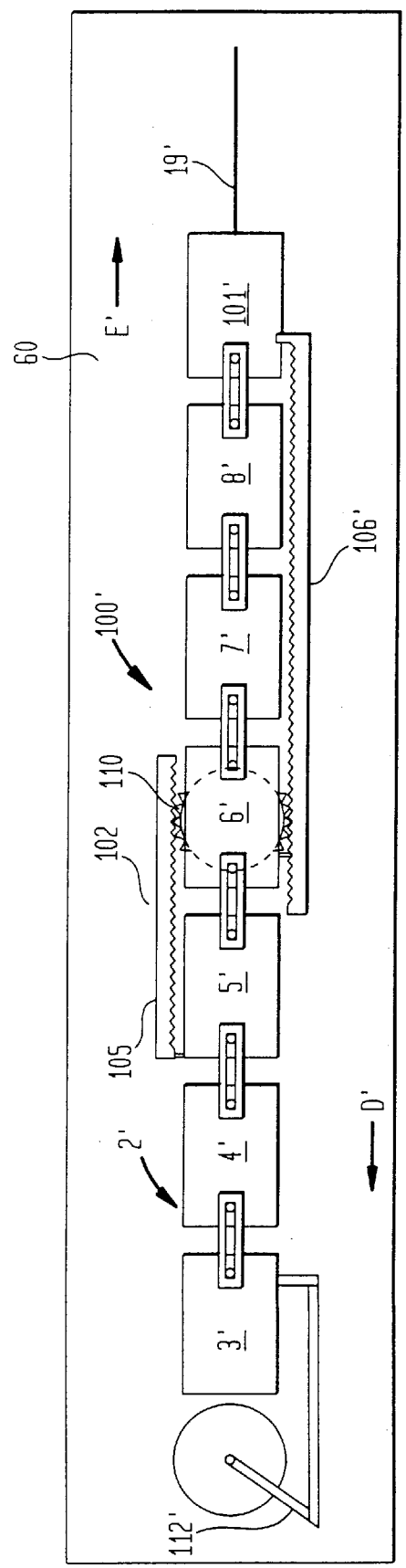
FIG. 7 is a schematic representation of the spacing device of FIG. 6 after spacing.

Referring now to FIGS. 6 and 7, a spacing device according to an alternative embodiment of the invention is described in which parts similar to those described with reference to FIGS. 4 and 5 are given the similar reference numerals. In this embodiment the spacing device, indicated generally by the reference numeral 100, comprises a train 2 and 2' of several carriages, the last carriage being indicated by the reference numeral 101 and 101'. In this embodiment, the actuating means comprises a rack and pinion system 102 having a first rack 105 rigidly connected to the third carriage 5 and 5' in FIGS. 6 and 7 (which in this case are not fixed, but freely movable on the carriage support means 60 and a second rack 106 and 106', mounted on an opposite side of the train 2 and 2' to the first rack 105, and fixed at one end to the last carriage 101 and 101'. The first rack 105 and second racks 105, 106' are operably connected by means of an associated pinion 110 which is fixed to the carriage support means intermediate the first and last carriages 3 and 3', 101 on the longitudinal axis 19, 19' of the train 2 and 2'.

In use, the driving means which in the case comprises a rotating spindle 112 and 112' pulls the first carriage 3 and 3' in the direction of the arrow D and D'. This movement pulls and spaces apart the carriages 3, 3', 4, 4', 5 and 5'. As the carriage 5 and 5' moves, it pulls the first rack 105 and 105' in the same direction which through rotation of the pinion 110 pushes the second rack 106 and 106' in the direction of the arrow E and E' thereby pushing the last carriages 101 and 101' along the axis 19 and 19' of the train 2 and 2' in a direction opposite to that of the first carriage 3 and 3'. Thus the carriages 6, 6', 7, 7', 8 and 8' 101 and 101' are spaced apart resulting in a spaced apart train of carriages 101' illustrated in FIG. 6.

Again, in this embodiment the pinion 110 may be fixed to any point along the train of carriages and the lengths of the racks may be adjusted accordingly.

In operation, once the soap bars which are carried on the carriages have been spaced apart, the whole train rotates 180°, about the axis of the train and moves in a downward arc to deliver the soap bars to the buckets passing below on a conveyor belt, which delivers the soap to a packing line.

Various other types of actuating means are envisaged by the Inventors for use in the spacing device according to the invention. For example, the movement of the first carriage may be harnessed by a pulley arrangement to pull the last carriage away from the train as the first carriage moves. Alternatively, the carriages may be mounted on a longitudinal axle which passes through each carriage. In such an embodiment, the first and last carriages would be threadingly engaged with the axle such that rotation of the axle moved the first and last carriages in opposite directions. The intermediate carriages would be coupled to the first and last carriages and freely movable along the axle.

The invention is not limited to the embodiments hereinbefore described which may be varied in both construction and detail without departing from the spirit of the invention.

We claim:

1. A spacing device for spreading stamped material during transfer from a stamping means to packaging line, the device comprising:

a train of at least a first carriage and a last carriage, each carriage being mounted for movement along an axis, the carriages being coupled together to allow spacing therebetween upon movement of one of the carriages; and driving means which when operated moves the first carriage in a direction along the axis;

actuating means which includes a pivotable lever with a first end, a second end, and a pivot axis therebetween, said pivot axis being situated between the first and the last carriage on the longitudinal axis of a carriage train, said first end being pivotally linked to the first carriage through a single pivotable linkage, said second end being pivotally linked to the last carriage through a single pivotable linkage;

wherein the driving means is a single driving means and the first carriage or the single driving means is operatively connected to an actuating means such that when the driving means moves the first carriage along the axis, the actuating means moves the last carriage along the axis in the direction opposite to the direction of movement of the first carriage, thereby spacing the train of carriages apart.

2. A spacing device as claimed in claim 1 in which the length of the lever on each side of the pivotal axis may be varied according to the position of the lever along the train of carriages.

3. A spacing device as claimed in claim 1 in which the train comprises six carriages and wherein the lever is pivotable about a third carriage.

4. An installation for manufacture of packaged stamped units characterised in that it comprises a spacing device as claimed in claim 1.

5. A process for manufacture of packaged stamped units comprising the step of transferring units of stamped material from a stamping means to a packaging line or the like by means of a spacing device as claimed in.

6. A process as claimed in claim 5 wherein after collection from the dies, each set of stamped units is rotated vertically downwards towards the spacing device through an angle about the longitudinal axis of the collecting means.

7. A spacing device as claimed in claim 1 in which the actuating means is a lever having a first end linked to the first carraige and an opposite end linked to the last carriage, whereby pivotal movement of the lever effects spacing of the at least first and last carriages.

8. A spacing device as claimed in claim 7 in which the train includes one or more carriages intermediate the first and last carriages and wherein the lever is pivotable about an intermediate carriage and/or about a longitudinal axis of the train.

9. A spacing device as claimed in claim 8 in which the carriage about which the lever pivots is fixed.

10. A spacing device as claimed in claim 1 in which the actuating means includes a rack and pinion mechanism comprising:

a pinion positioned along a longitudinal axis of the train between the first and last carriages;

a first rack operably connecting the first carriage to the pinion; and a second rack operably connecting the pinion to the last carriage.

11. A spacing device as claimed in claim 10 in which the train comprises seven said carriages and wherein the pinion is adjustably mounted beneath a forth said carriage and the first rack is fixed to a third said carriage.

12. A spacing device as claimed in claims 1, 10, or 11, wherein at least one stamped unit comprise a surfactant.

13. A spacing device as claimed in any preceding claim in which the carriages are movably mounted on a carriage support means, wherein the carriage support means is rotatable about a vertical axis perpendicular to a longitudinal axis of the train.

14. A spacing device as claimed in claim 13 in which the actuating means is contained within the carriage support means.

15. A spacing device for spreading stamped material during transfer from a stamping means to a packaging line, the device comprising:

a train of at least a first and last carriage, each carriage being mounted for movement along an axis, the carriages being coupled together to allow spacing therebetween upon movement of one of the carriages; and driving means which when operated moves the first carriage along the axis, wherein the driving means is a single driving means and the first carriage or the single driving means is operatively connected to an actuating means such that when the driving means moves the first carriage in a direction along the axis, the actuating means moves the last carriage along the axis in the direction opposite to the direction of movement of the first carriage, thereby spacing the train of carriages apart, said actuating means selected from the group consisting of a rack and pinion mechanism, a pulley mechanism, or a threaded longitudinal axle mechanism.

\* \* \* \* \*